United States Patent
Felcman et al.

(10) Patent No.: US 6,830,394 B2
(45) Date of Patent: Dec. 14, 2004

(54) KEYBOARD HAVING A TRACK BALL MECHANISM AND A SCROLL MECHANISM

(75) Inventors: Chris Felcman, Spring, TX (US); David P. Eichberger, Houston, TX (US); Gary Landrum, Montgomery, TX (US); Ty Rarick, Austin, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 121 days.

(21) Appl. No.: 09/873,778

(22) Filed: Jun. 4, 2001

(65) Prior Publication Data

US 2002/0181991 A1 Dec. 5, 2002

(51) Int. Cl.[7] .................................................. B41J 5/10
(52) U.S. Cl. ....................................... 400/472; 400/489
(58) Field of Search ............................... 400/489, 485, 400/472; 341/21, 22; 200/5 R, 52 R; 361/680; 364/709.12; 345/168, 169; D14/397, 417

(56) References Cited

U.S. PATENT DOCUMENTS

| | | |
|---|---|---|
| D291,574 S | 8/1987 | Kim .......................... D14/100 |
| 5,122,654 A | 6/1992 | Koh et al. ................... 250/221 |
| D350,126 S | 8/1994 | Leung ........................ D14/115 |
| D363,277 S | 10/1995 | Chung ........................ D14/115 |
| D365,335 S | 12/1995 | Busch et al. ............... D14/106 |
| D366,256 S | 1/1996 | Landry et al. ............. D14/115 |
| 5,808,922 A * | 9/1998 | Martinez et al. ............ 708/141 |
| 5,841,076 A * | 11/1998 | Schwartz et al. ........ 177/25.13 |
| 6,016,139 A * | 1/2000 | Terasawa et al. ........... 345/169 |
| 6,043,809 A | 3/2000 | Holehan ..................... 345/168 |
| 6,047,196 A * | 4/2000 | Makela et al. .............. 455/556 |
| 6,075,518 A * | 6/2000 | Pruchniak ................... 345/157 |
| 6,091,404 A | 7/2000 | Hong et al. ................. 345/167 |
| 6,351,225 B1 * | 2/2002 | Moreno ....................... 341/22 |
| 6,392,634 B1 * | 5/2002 | Bowers et al. ............. 345/163 |

* cited by examiner

Primary Examiner—Anthony H. Nguyen

(57) ABSTRACT

A combination of a track ball mechanism and a scroll mechanism. The combination may be placed proximate a standard portion of a keyboard so that a user can access either the track ball mechanism or the scroll mechanism without removing either hand from the standard portion of the keyboard. The track ball mechanism and the scroll mechanism may be integrated with one another to some extent.

43 Claims, 5 Drawing Sheets

KEYBOARD HAVING A TRACK BALL MECHANISM AND A SCROLL MECHANISM

BACKGROUND OF THE INVENTION

The present technique relates generally to the field of computer systems and, more specifically, to a keyboard having a track ball mechanism and a scroll mechanism.

BACKGROUND OF THE RELATED ART

This section is intended to introduce the reader to various aspects of art that may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Keyboards have been used by people to input information into machines for hundreds of years. Keyboards first gained wide public recognition in the United States around 1867 when three inventors from Milwaukee, Wis. designed the first practical typewriter. The typewriter included a keyboard to enable a user to cause the typewriter to produce letters, numbers, and punctuation on a page of paper. As the design of typewriters progressed, the keys of the keyboard where soon laid out in a configuration that has now become standard and often referred to as the "QWERTY" configuration. This standard keyboard configuration remained the same for the next one hundred years, and it is still in use today.

With the advent of computer systems, however, this standard keyboard configuration has been supplemented. This supplementation has occurred because of the additional features that computer systems provide in comparison to traditional typewriters. Keystrokes on a computer are not transferred to a page of paper immediately as they are on a typewriter. Instead, each keystroke causes the computer to perform a specific function. In a word processing application, for example, many keystrokes are simply transferred directly to the computer's screen in a manner similar to that of a typewriter. However, many other keystrokes cause the computer to perform a variety of other functions, such as insertion, deletion, file saving, formatting, etc. To perform these additional functions without substantially enlarging the size of the standard keyboard or adding many extra keys, computer keyboards have been provided with various "function" keys that may perform a variety of functions depending upon the application being executed by the computer. Computer keyboards have also been provided with a "CTRL" key and an "ALT" key, which can be used in conjunction with many of the other keys to perform alternate functions.

In addition to performing these types of alternate functions, many applications require some means for allowing the user to navigate on the screen. For example, in applications where the information cannot be displayed on a single screen, it is advantageous for a user to be able to scroll from one screen to the next. Also, many applications use a "position bar," which is typically a flashing line or box, so that the user can determine the location where keystrokes will appear on screen. The keyboard typically includes "scroll keys" to allow the user to move the position bar up, down, side-to-side, and page-to-page. Many applications also use a "cursor," which is typically a slanted arrow, so that the user can activate functional icons and the like displayed on the screen. A "track ball" mechanism is typically provided to enable the user to move the cursor around on the screen. The track ball may be provided in a "mouse" that is separate from the keyboard, or it may be provided on the keyboard itself.

Typically, the scroll keys, which usually include four keys (up arrow, down arrow, left arrow, and right arrow), are placed on the right side of the keyboard by themselves. Alternatively, the scroll keys may be placed as alternate functions for certain keys in a numerical keypad located on the right side of the keyboard. Thus, when a user desires to navigate using the scroll keys, the user's right hand must leave the standard portion of the keyboard and move several inches to the right. While such a movement may not seem excessive or awkward, it is often enough to cause the user to move their right hand to an incorrect position, thus causing an undesired keystroke or position bar movement. If the user removes their attention from the screen to their hands to ensure that the correct scroll key is reached, this shift of attention hampers efficiency.

The track ball, on the other hand, is typically placed elsewhere on the keyboard. Most is commonly, the track ball is placed beneath the space bar. Therefore, when a user desires to navigate using the track ball, the track ball may be accessed by either thumb without requiring the user to remove either hand from the standard portion of the keyboard. Of course, if the track ball is placed farther from the standard portion of the keyboard, it too suffers from some of the drawbacks mentioned above.

The present invention may address one or more of the issues discussed above.

SUMMARY OF THE INVENTION

Certain aspects commensurate in scope with the originally disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present technique, there is provided a combination of a track ball mechanism and a scroll mechanism that is located in a central portion of the keyboard, so that a user can access the track ball mechanism and the scroll mechanism with either hand without moving either hand from the standard portion of the keyboard.

According to another aspect of the present technique, there is provided a combination of a track ball mechanism and a scroll mechanism that is located directly above or beneath one of the user's hands, so that a user can access the track ball mechanism and the scroll mechanism with one hand without moving either hand from the standard portion of the keyboard.

According to yet another aspect of the present technique, there is provided a combination of a track ball mechanism and a scroll mechanism where the track ball mechanism and the scroll mechanism essentially overlap or are integrated with one another.

According to still another aspect of the present technique, there is provided a combination of a track ball mechanism and a scroll mechanism where the track ball mechanism and the scroll mechanism are placed in close proximity to one another.

BRIEF DESCRIPTION OF THE DRAWINGS

Exemplary embodiments of the invention will hereafter be described with reference to the accompanying drawings, wherein like reference numerals denote like elements, and wherein.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
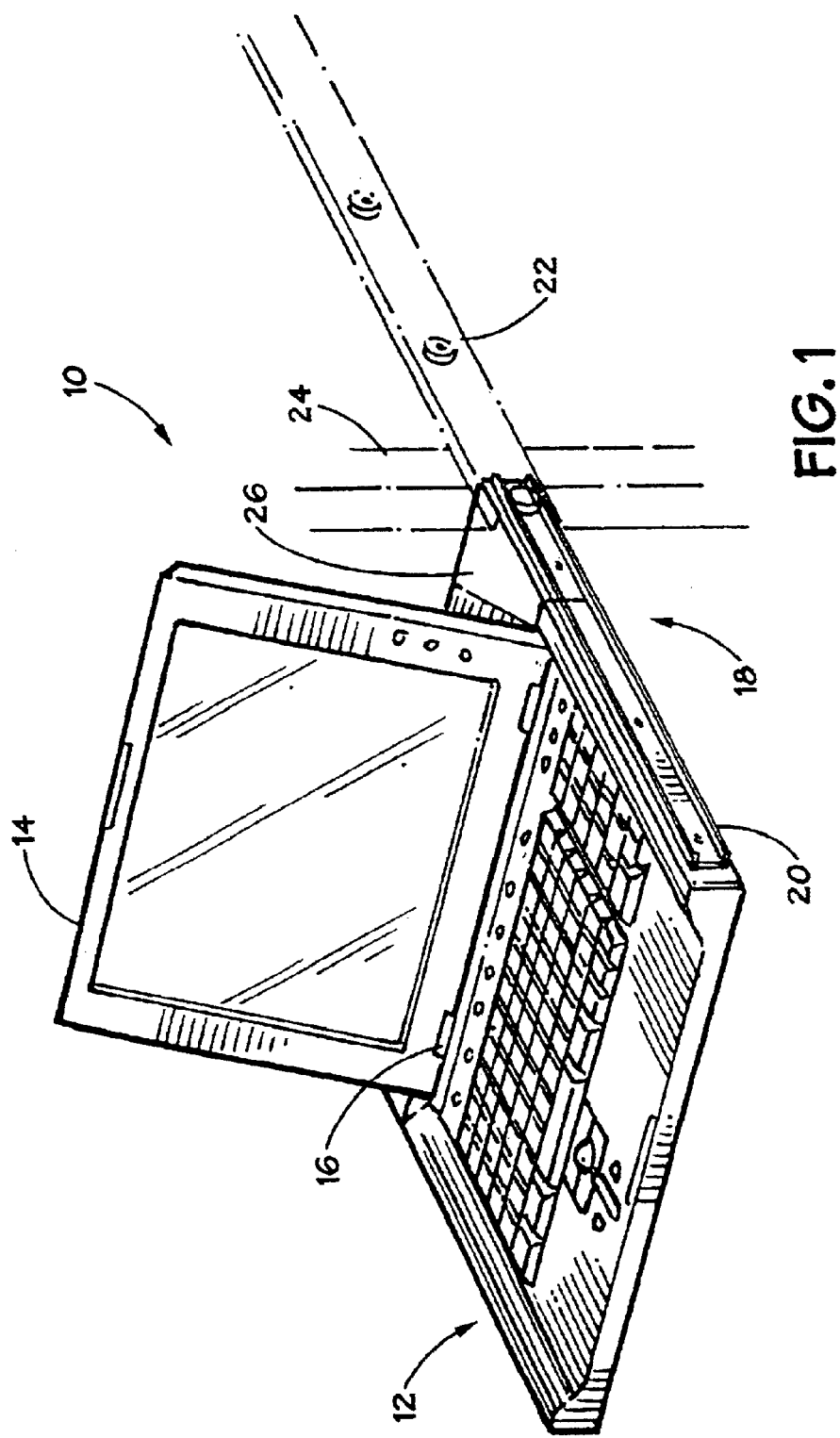
FIG. 1 illustrates a perspective view of a device having a keyboard in accordance with the present technique.

Turning now to the drawings and referring initially to FIG. 1, there is illustrated a perspective view of an exemplary device 10 having a keyboard 12. The device 10 may be any of a variety of types, such as a personal computer, laptop, rack mountable device, etc. In this exemplary embodiment, the device 10 is illustrated as having a display 14. The display 14 may be coupled to the keyboard 12 by a hinge assembly 16, so that the display 14 may be rotated to an open position when in use (as illustrated) or to a closed position when not in use. The device 10 is also illustrated as being a rack mountable device. Accordingly, the device 10 may include a slidable mounting assembly 18, where a first portion 20 of the assembly 18 may be coupled to the device 10 and where a second portion 22 of the assembly 18 may be coupled to a rack 24. The first portion 20 is adapted to slide relative to the second portion 22 to enable a user to extend the device 10 from the rack 24 during use and to store the device 10 in the rack 24 when not in use. The device 10 may further include a housing 26, which may house various computing circuitry and components, such as a processor, memory, disk drives, communication devices, audio/video devices, and other suitable devices, such as a video controller for the display 14 and circuitry associated with the keyboard 12.

Figure 2:
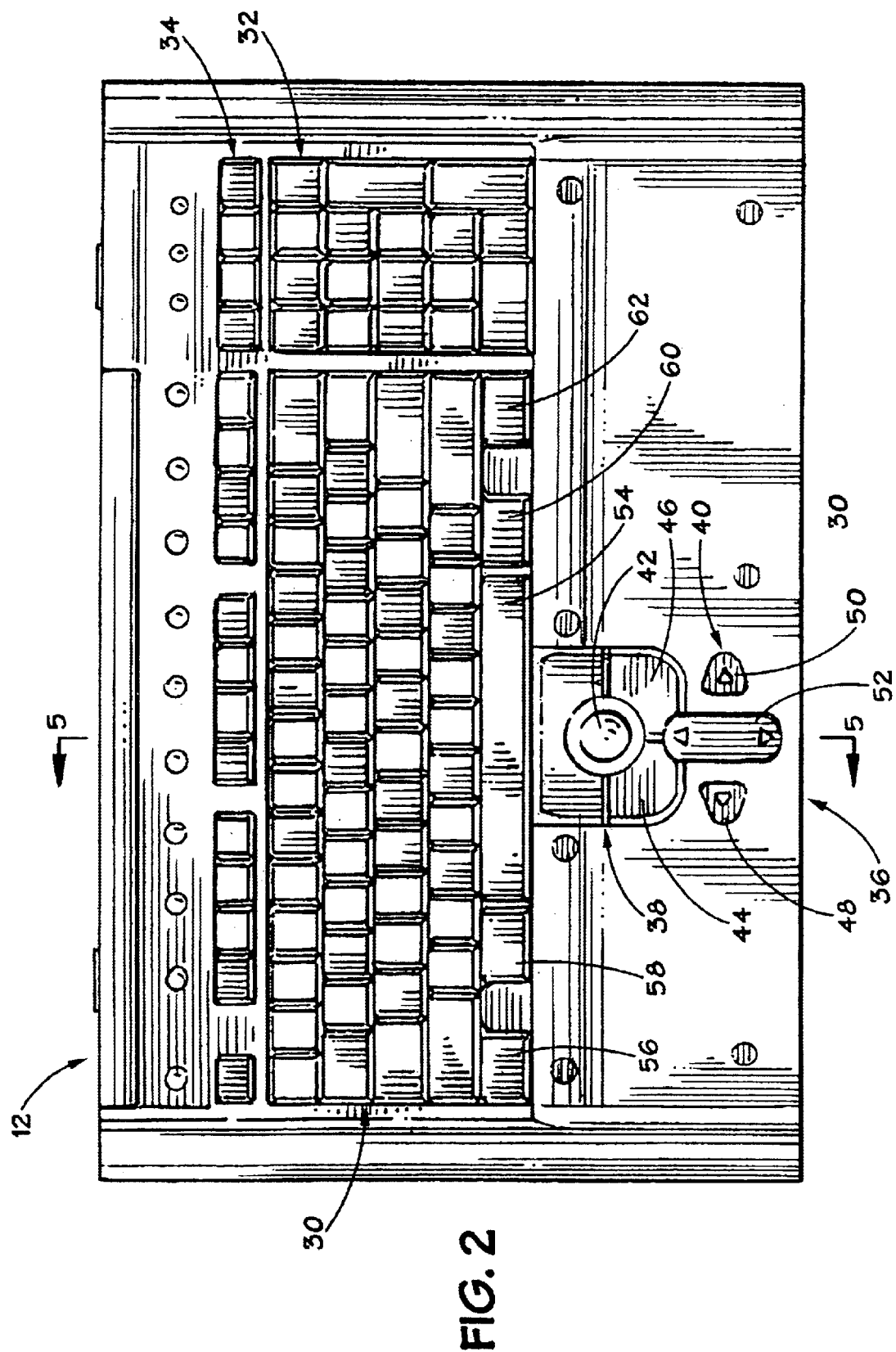
FIG. 2 illustrates a top view of the keyboard of FIG. 1.

Referring additionally to FIG. 2, the keyboard 12 includes a standard portion 30 that typically resembles a standard "QWERTY" keyboard. Adjacent to the standard portion 30, a numerical keypad 32 may be present. Above the standard portion 30 and/or the numerical keypad 32, a row of function keys 34 may be present. Regardless of whether the numerical keypad 32 and the row of function keys 34 are present, a user will typically and primarily use the standard portion 30 of the keyboard 12. Accordingly, a combination 36 of a track ball mechanism 38 and a scroll mechanism 40 is placed proximate the standard portion 30 of the keyboard 12.

In this embodiment, the track ball mechanism 38 includes a track ball 42, and activation buttons 44 and 46, and the scroll mechanism 40 includes a left arrow button 48, a right arrow button 50, and an up/down arrow button 52. The track ball 42 may be rotated in any direction to place the cursor anywhere on the screen. When the cursor is in the desired location, one of the activation buttons 44 or 46 may be actuated to perform the desired function. Conversely, the scroll buttons 48, 50, and 52 are provided to facilitate horizontal and vertical scrolling in a graphical user interface, such as in a program having horizontal and vertical scroll bars. Specifically, the scroll buttons 48 and 50 can be depressed to scroll left and right, respectively, while the scroll button 52 can be depressed on an upper or lower portion for upward and downward scrolling, respectively.

It should be appreciated that the combination 36 is advantageously placed close to the standard portion 30 of the keyboard 12. In this embodiment, the edge of the track ball 42 is located less than two inches, and advantageously less than one inch, from the space key 54 of the standard portion 30, and the scroll mechanism is located less than three inches, and advantageously less than two inches, from the space key 54. This close proximity to the most-used standard portion 30 of the keyboard 12 facilitates access by a user. In fact, a user does not have to move their hands away from the standard portion 30 of the keyboard 12 to use either the track ball mechanism 38 or the scroll mechanism 40.

Further, it should be noted that the combination 36 of the track ball mechanism 38 and the scroll mechanism 40 is located in a central portion of the keyboard in this embodiment. With the combination 36 in this location, a user can access the track ball mechanism 38 and the scroll mechanism 40 with either hand without moving either hand from the standard portion of the keyboard. Alternatively, the combination 36 of the track ball mechanism 38 and the scroll mechanism 40 may be located directly beneath one of the user's hands, e.g., under the keys 56 and 58 or under the keys 60 and 62. In either of these positions, a user can access the track ball mechanism 38 and the scroll mechanism 40 with one hand without moving either hand from the standard portion 30 of the keyboard 12.

To facilitate user access, the track ball mechanism 38 and the scroll mechanism 40 are advantageously placed in close proximity to one another. In fact, referring additionally to FIG. 3, it can be seen that the track ball mechanism 38 and the scroll mechanism 40 may be arranged so that they essentially overlap or are integrated with one another. Specifically, in this embodiment, the up/down arrow button 52 is placed within recesses 64 and 66 in the activation buttons 44 and 46, respectively. By overlapping or integrating the track ball mechanism 38 with the scroll mechanism 40, the space occupied by the combination 36 decreases. It also moves the mechanisms (in this case the scroll mechanism 40) closer to the user to facilitate access even further.

Figure 4:
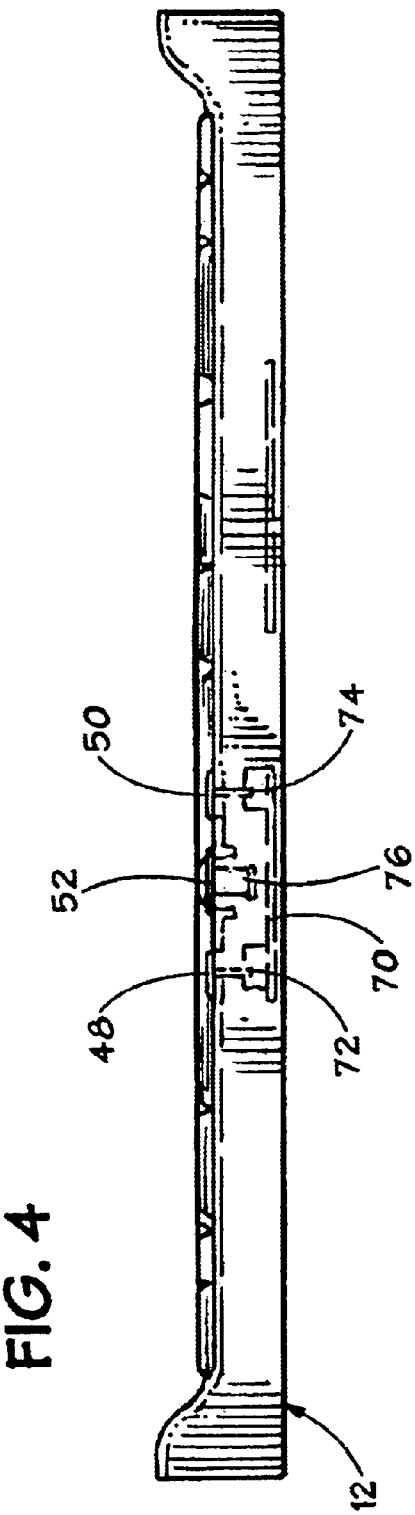
FIG. 4 illustrates a cross-sectional view of the keyboard of FIG. 1 taken along line 4—4.
Figure 5:
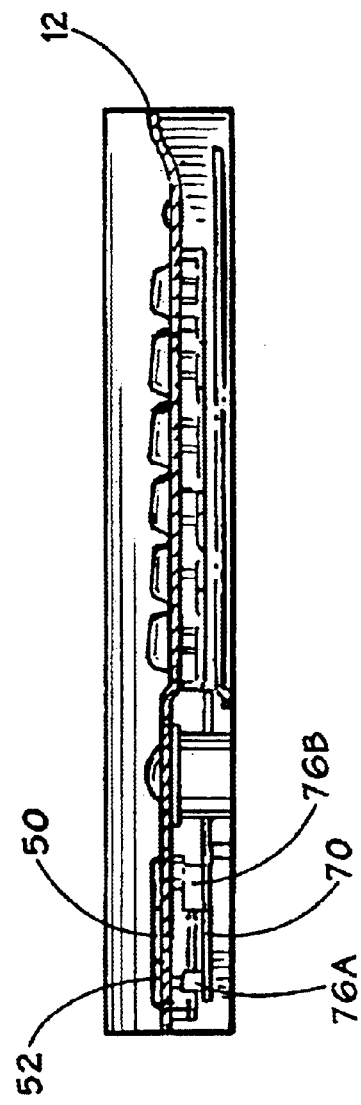
FIG. 5 illustrates a cross-sectional view of the keyboard of FIG. 1 taken along line 5—5.

The scroll buttons 48, 50, and 52 themselves are relatively conventional. In this embodiment, the scroll buttons 48, 50, and 52 are plastic and have a springy tactical touch. As illustrated in FIGS. 4 and 5, pressing the scroll buttons 48, 50, and 52 activates respective switches 72, 74, and 76A and 76B (up and down) on a printed circuit board 70 located beneath the scroll buttons 48, 50, and 52. Again, the printed circuit board 70 and the switches 72, 74, and 76A and B are relatively conventional.

Figure 3:
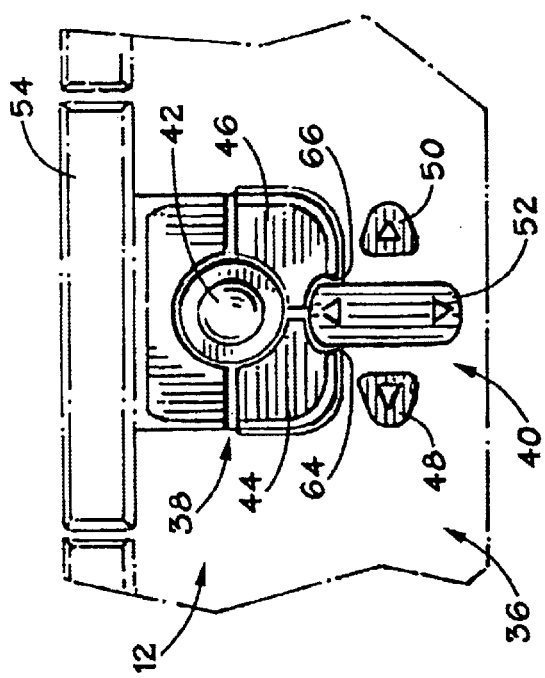
FIG. 3 is an enlarged partial top view of the keyboard of FIG. 1 illustrating one embodiment of a combination of a track ball mechanism and a scroll mechanism.

Although the discussion to this point has been primarily directed toward the particular embodiment illustrated in FIG. 3, it should be appreciated that various other embodiments are also contemplated. Some of these embodiments are illustrated in FIGS. 6–12 discussed below. However, those skilled in the art will understand that these exemplary embodiments are not limiting to the invention, as other embodiments not specifically illustrated may fall within the spirit and scope of the appended claims.

The alternative combinations 36A–G described below are also advantageously placed close to the standard portion 30 of the keyboard 12. For instance, the combinations 36A–G may be located less than two inches, and advantageously less than one inch, from the space key 54 of the standard portion 30. As previously discussed, this close proximity to the most-used standard portion 30 of the keyboard 12 facilitates access by a user. In fact, a user does not have to move their hands away from the standard portion 30 of the keyboard 12 to use either portion of the respective combinations 36A–G.

In addition, it should be noted that the combinations 36A–G may be located in a central portion of the keyboard so that a user can access either portion of the respective combinations 36A–G with either hand without moving either hand from the standard portion of the keyboard. Alternatively, the combinations 36A–G may be located directly beneath one of the user's hands, e.g., under the keys 56 and 58 or under the keys 60 and 62. In either of these positions, a user can access either portion of the respective combinations 36A–G with one hand without moving either hand from the standard portion 30 of the keyboard 12.

Figure 6:
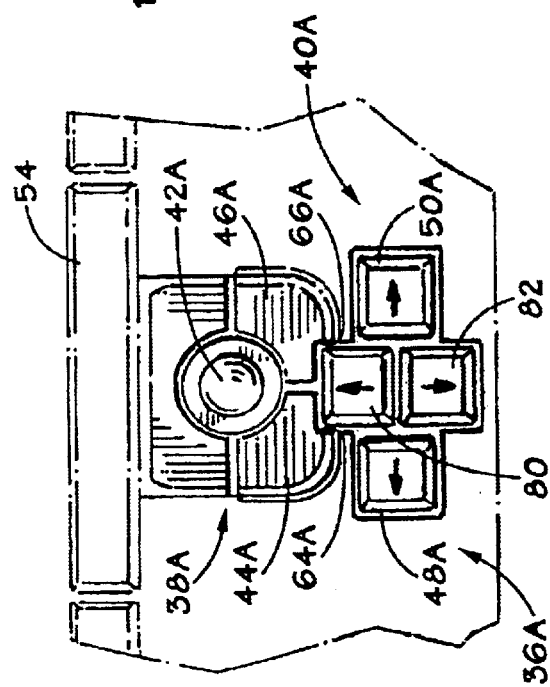
FIG. 6 is an enlarged partial top view of the keyboard of FIG. 1 illustrating a second embodiment of a combination of a track ball mechanism and a scroll mechanism.

Referring now to FIG. 6, a second embodiment of a combination of a track ball mechanism and a scroll mechanism is illustrated. For purposes of clarity, similar reference numerals will be used to designate elements similar to those discussed above. Accordingly, in this second embodiment, it should be noted that the combination 36A of a track ball mechanism 38A and a scroll mechanism 40A is placed proximate the standard portion 30 of the keyboard 12.

In this second embodiment, the track ball mechanism 38A includes a track ball 42A, and activation buttons 44A and 46A, and the scroll mechanism 40A includes a left arrow button 48A, a right arrow button 50A, an up arrow button 80, and a down arrow button 82. The track ball 42A and the activation buttons 44A and 46A operate as previously described. The scroll buttons 48A, 50A, 80, and 82 also operate in a manner similar to the first embodiment in that they are provided to facilitate horizontal and vertical scrolling in a graphical user interface, such as in a program having horizontal and vertical scroll bars. Specifically, the scroll buttons 48A and 50A can be depressed to scroll left and right, respectively, while the scroll buttons 80 and 82 can be depressed to scroll up and down, respectively. The primary differences between the first and second embodiments reside in the use of more conventional buttons for the scroll buttons 48A, 50A, 80, and 82, and in the use of separate buttons 80 and 82 for scrolling up and down respectively.

Like the first embodiment, to facilitate user access, the track ball mechanism 38A and the scroll mechanism 40A are advantageously placed in close proximity to one another. In FIG. 6, it can be seen that the track ball mechanism 38A and the scroll mechanism 40A may be arranged so that they essentially overlap or are integrated with one another. Specifically, in this second embodiment, the up arrow button 80 is placed within recesses 64A and 66A in the activation buttons 44A and 46A, respectively. By overlapping or integrating the track ball mechanism 38A with the scroll mechanism 40A, the space occupied by the combination 36A decreases. It also moves the mechanisms (in this case the scroll mechanism 40A) closer to the user to facilitate access even further.

Figure 7:
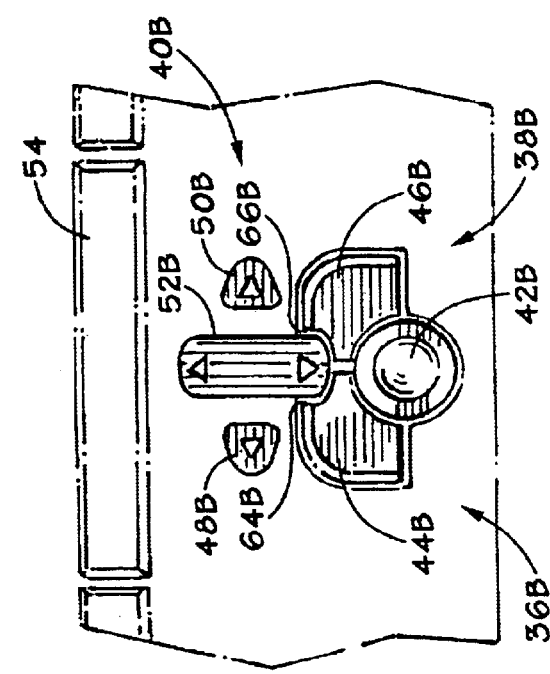
FIG. 7 is an enlarged partial top view of the keyboard of FIG. 1 illustrating a third embodiment of a combination of a track ball mechanism and a scroll mechanism.

Referring now to FIG. 7, a third embodiment of a combination of a track ball mechanism and a scroll mechanism is illustrated. Again, for purposes of clarity, similar reference numerals will be used to designate elements similar to those discussed above. Accordingly, in this third embodiment, it should be noted that the combination 36B of a track ball mechanism 38B and a scroll mechanism 40B is placed proximate the standard portion 30 of the keyboard 12. Of course, unlike the first embodiment, this third embodiment has the positions of the track ball mechanism 38B and the scroll mechanism 40B switched, so that the scroll mechanism 40B is closer to the standard portion 30 of the keyboard 12 than the track ball mechanism 38B.

In this third embodiment, the track ball mechanism 38B includes a track ball 42B, and activation buttons 44B and 46B, and the scroll mechanism 40B includes a left arrow button 48B, a right arrow button 50B, and an up/down arrow button 52B. The track ball 42B and the activation buttons 44B and 46B operate as previously described. The scroll buttons 48A, 50A, and 52B also operate in a manner as described with reference to the first embodiment.

Like the first embodiment, to facilitate user access, the track ball mechanism 38B and the scroll mechanism 40B are advantageously placed in close proximity to one another. In FIG. 7, it can be seen that the track ball mechanism 38B and the scroll mechanism 40B may be arranged so that they essentially overlap or are integrated with one another. Specifically, in this third embodiment, the up/down arrow button 52B is placed within recesses 64B and 66B in the activation buttons 44B and 46B, respectively. By overlapping or integrating the track ball mechanism 38B with the scroll mechanism 40B, the space occupied by the combination 36B decreases. It also moves the mechanisms (in this case the track ball mechanism 38B) closer to the user to facilitate access even further.

Figure 8:
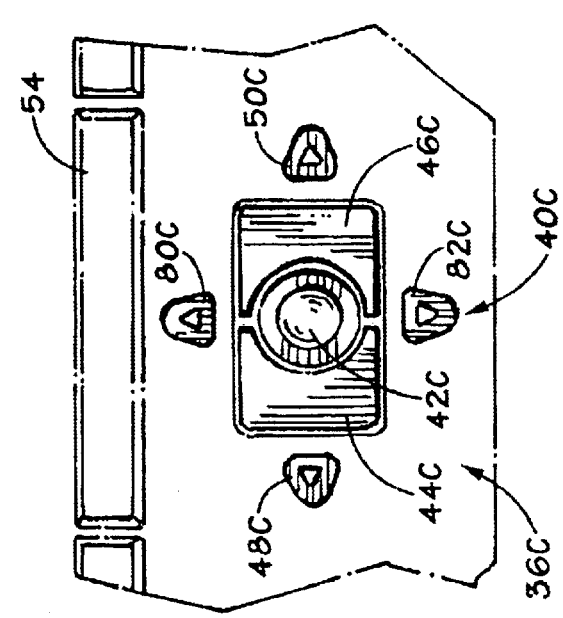
FIG. 8 is an enlarged partial top view of the keyboard of FIG. 1 illustrating a fourth embodiment of a combination of a track ball mechanism and a scroll mechanism.

Referring now to FIG. 8, a fourth embodiment of a combination of a track ball mechanism and a scroll mechanism is illustrated. Again, for purposes of clarity, similar reference numerals will be used to designate elements similar to those discussed above. Accordingly, in this fourth embodiment, it should be noted that the combination 36C of a track ball mechanism 38C and a scroll mechanism 40C is placed proximate the standard portion 30 of the keyboard 12.

In this fourth embodiment, the track ball mechanism 38C includes a track ball 42C, and activation buttons 44C and 46C, and the scroll mechanism 40C includes a left arrow button 48C, a right arrow button 50C, an up arrow button 80C, and a down arrow button 82C. The track ball 42C and the activation buttons 44C and 46C operate as previously described. The scroll buttons 48A, 50A, 80C, and 82C operate as described with reference to FIG. 6. The primary differences between the first and fourth embodiments reside in the use of separate buttons 80C and 82C for scrolling up and down, respectively. In addition, instead of clustering the scroll buttons 48C, 50C, 80C, and 82C together as in the previous embodiments, the scroll buttons 48C, 50C, 80C, and 82C are distributed around the track ball mechanism 38C.

Like the first embodiment, to facilitate user access, the track ball mechanism 38C and the scroll mechanism 40C are advantageously placed in close proximity to one another. In FIG. 8, it can be seen that the track ball mechanism 38C and the scroll mechanism 40C may be arranged so that they are integrated with one another in the sense that the scroll buttons 48C, 50C, 80C, and 82C surround the track ball mechanism 38C.

Figure 9:
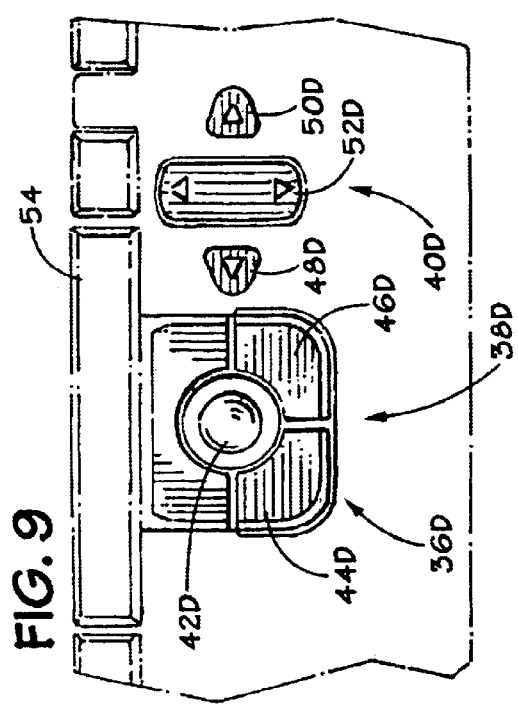
FIG. 9 is an enlarged partial top view of the keyboard of FIG. 1 illustrating a fifth embodiment of a combination of a track ball mechanism and a scroll mechanism.

Referring now to FIG. 9, a fifth embodiment of a combination of a track ball mechanism and a scroll mechanism is illustrated. Again, for purposes of clarity, similar reference numerals will be used to designate elements similar to those discussed above. Accordingly, in this fifth embodiment, it should be noted that the combination 36D of a track ball mechanism 38D and a scroll mechanism 40D is placed proximate the standard portion 30 of the keyboard 12.

In this fifth embodiment, the track ball mechanism 38D includes a track ball 42D, and activation buttons 44D and 46D, and the scroll mechanism 40D includes a left arrow button 48D, a right arrow button 50D, and an up/down arrow button 52D. The track ball 42D and the activation buttons 44D and 46D operate as previously described. The scroll buttons 48D, 50D, and 52D also operate in a manner as described in reference to the first embodiment.

The primary difference between the first and fifth embodiments resides in the placement of the scroll mechanism 40D. Here, the track ball mechanism 38D is centrally located beneath the space key 54 proximate the standard portion 30 of the keyboard 12. The scroll mechanism 40D, however, is not located above, beneath, or around the track ball mechanism 38D as in the previous embodiments. Instead, the scroll mechanism 40D is placed to the right of the track ball mechanism 38D, although it may be placed to the left as well. It should be noted that the scroll mechanism 40D is not placed far from the track ball mechanism 38D. Rather, like the first embodiment, to facilitate user access, the track ball mechanism 38D and the scroll mechanism 40D are advantageously placed in close proximity to one another, e.g, less than one inch of separation. Unlike previous embodiments that have illustrated the track ball mechanisms and the scroll mechanisms as being integrated in some sense, the track ball mechanism 38D and the scroll mechanism 40D are not integrated with one another. However, in this side-by-side relationship, both mechanisms 38D and 40D may be located quite close to the standard portion 30 of the keyboard 12, e.g., less than one inch from the space key 54. Thus, a user can easily access both mechanisms 38D and 40D without removing either hand from the standard portion 30 of the keyboard 12.

Figure 10:
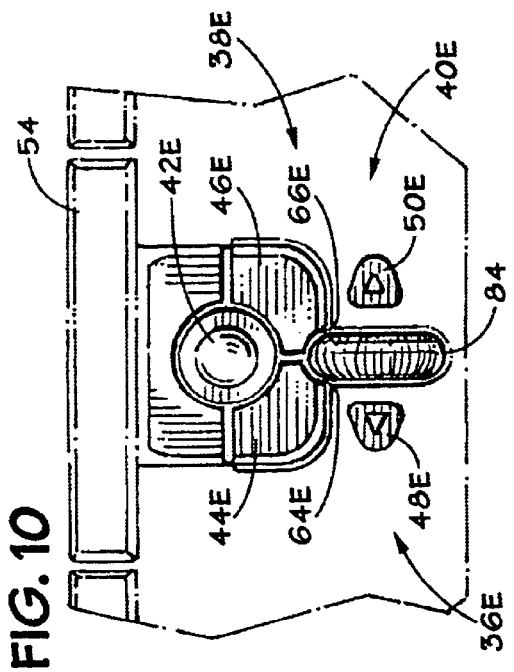
FIG. 10 is an enlarged partial top view of the keyboard of FIG. 1 illustrating a sixth embodiment of a combination of a track ball mechanism and a scroll mechanism.

Referring now to FIG. 10, a sixth embodiment of a combination of a track ball mechanism and a scroll mechanism is illustrated. Again, for purposes of clarity, similar reference numerals will be used to designate elements similar to those discussed above. Accordingly, in this sixth embodiment, it should be noted that the combination 36E of a track ball mechanism 38E and a scroll mechanism 40E is placed proximate the standard portion 30 of the keyboard 12.

In this sixth embodiment, the track ball mechanism 38E includes a track ball 42E and activation buttons 44E and 46E. The track ball 42E and the activation buttons 44E and 46E operate as previously described. The scroll mechanism 40E includes a left arrow button 48E and a right arrow button 50E as previously described. Unlike the previous embodiments, however, the scroll mechanism 40E includes a wheel 84 in place of an up/down arrow button. By turning the wheel 84 toward the standard portion 30 of the keyboard 12, the screen may be scrolled upwardly, and by turning the wheel 84 away from the standard portion 30 of the keyboard 12, the screen may be scrolled downwardly.

Like the first embodiment, to facilitate user access, the track ball mechanism 38E and the scroll mechanism 40E are advantageously placed in close proximity to one another. In FIG. 10, it can be seen that the track ball mechanism 38E and the scroll mechanism 40E may be arranged so that they essentially overlap or are integrated with one another. Specifically, in this sixth embodiment, the wheel 84 is placed within recesses 64E and 66E in the activation buttons 44E and 46E, respectively. By overlapping or integrating the track ball mechanism 38E with the scroll mechanism 40E, the space occupied by the combination 36E decreases. It also moves the mechanisms (in this case the scroll mechanism 40E) closer to the user to facilitate access even further.

Figure 11:
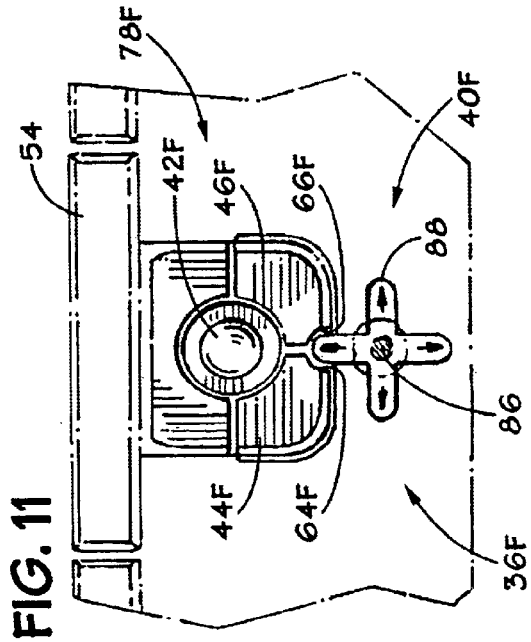
FIG. 11 is an enlarged partial top view of the keyboard of FIG. 1 illustrating a seventh embodiment of a combination of a track ball mechanism and a scroll mechanism.

Referring now to FIG. 11, a seventh embodiment of a combination of a track ball mechanism and a scroll mechanism is illustrated. Again, for purposes of clarity, similar reference numerals will be used to designate elements similar to those discussed above. Accordingly, in this seventh embodiment, it should be noted that the combination 36F of a track ball mechanism 38F and a scroll mechanism 40F is placed proximate the standard portion 30 of the keyboard 12.

In this seventh embodiment, the track ball mechanism 38F includes a track ball 42F and activation buttons 44F and 46F. The track ball 42F and the activation buttons 44F and 46F operate as previously described. However, unlike the previous embodiments, the scroll mechanism 40F does not include any arrow buttons. Instead, the scroll mechanism 40F includes a joystick 86 that operates within a guide 88. By moving the joystick 86 in one of the four directions within the guide 88, the screen may be scrolled upwardly, downwardly, to the left, or to the right.

Like the first embodiment, to facilitate user access, the track ball mechanism 38F and the scroll mechanism 40F are advantageously placed in close proximity to one another. In FIG. 11, it can be seen that the track ball mechanism 38F and the scroll mechanism 40F may be arranged so that they essentially overlap or are integrated with one another. Specifically, in this seventh embodiment, the guide 88 is placed within recesses 64F and 66F in the activation buttons 44F and 46F, respectively. By overlapping or integrating the track ball mechanism 38F with the scroll mechanism 40F, the space occupied by the combination 36F decreases. It also moves the mechanisms (in this case the scroll mechanism 40F) closer to the user to facilitate access even further.

Figure 12:
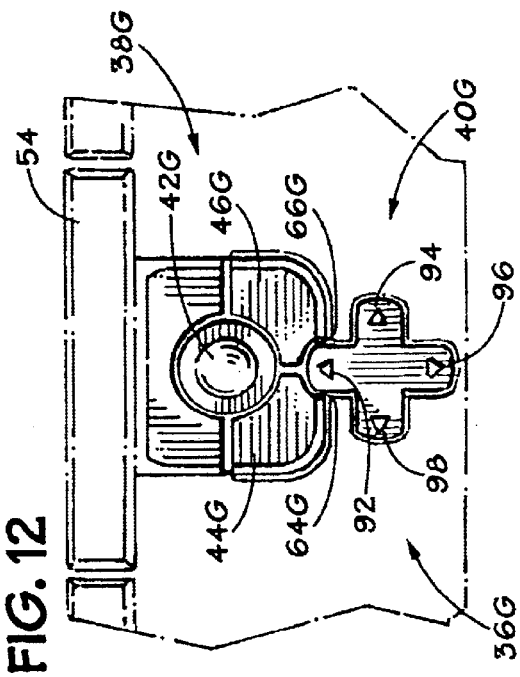
FIG. 12 is an enlarged partial top view of the keyboard of FIG. 1 illustrating an eighth embodiment of a combination of a track ball mechanism and a scroll mechanism.

Referring now to FIG. 12, an eighth embodiment of a combination of a track ball mechanism and a scroll mechanism is illustrated. Again, for purposes of clarity, similar reference numerals will be used to designate elements similar to those discussed above. Accordingly, in this second embodiment, it should be noted that the combination 36G of a track ball mechanism 38G and a scroll mechanism 40G is placed proximate the standard portion 30 of the keyboard 12.

In this eighth embodiment, the track ball mechanism 38G includes a track ball 42G and activation buttons 44G and 46G. The track ball 42G and the activation buttons 44G and 46G operate as previously described. However, unlike the previous embodiments, the scroll mechanism 40G does not include separate arrow buttons. Instead, the scroll mechanism 40G includes a single button 90. The button 90 has four legs 92, 94, 96, and 98 which correspond to the up, right, down, and left arrows, respectively. The button 90 is gimbaled at its center so that a user can press any of the four legs 92, 94, 96, and 98 to scroll the screen upwardly, downwardly, to the left, or to the right.

Like the first embodiment, to facilitate user access, the track ball mechanism 38G and the scroll mechanism 40G are advantageously placed in close proximity to one another. In FIG. 12, it can be seen that the track ball mechanism 38G and the scroll mechanism 40G may be arranged so that they essentially overlap or are integrated with one another. Specifically, in this eighth embodiment, the leg 92 of the button 90 is placed within recesses 64G and 66G in the activation buttons 44G and 46G, respectively. By overlapping or integrating the track ball mechanism 38G with the scroll mechanism 40G, the space occupied by the combination 36G decreases. It also moves the mechanisms (in this case the scroll mechanism 40G) closer to the user to facilitate access even further.

While the invention may be susceptible to various modifications and alternative forms, specific embodiments have been shown by way of example in the drawings and have been described in detail herein. However, it should be understood that the invention is not intended to be limited to the particular forms disclosed. Accordingly, the invention is intended to cover all modifications, equivalents, and alternatives falling within the spirit and scope of the invention as defined by the following appended claims.

What is claimed is:

1. A keyboard comprising:
   a standard keypad;
   a track ball mechanism; and
   a scroll mechanism being located less than one inch from the track ball mechanism, at least one of the track ball mechanism and the scroll mechanism being located less than one inch from the standard keypad, wherein the track ball mechanism is disposed above the scroll mechanism.

2. The keyboard, as set forth in claim 1, wherein the standard keypad comprises a "QWERTY" keypad.

3. The keyboard, as set forth in claim 1, wherein the track ball mechanism comprises:
   a track ball; and
   two buttons positioned adjacent the track ball.

4. The keyboard, as set forth in claim 1, wherein the scroll mechanism comprises:
   a device adapted to scroll up;
   a device adapted to scroll down;
   a device adapted to scroll left; and
   a device adapted to scroll right.

5. The keyboard, as set forth in claim 1, wherein the scroll mechanism comprises:
   a single button moveable in a left direction, a right direction, an upward direction, and a downward direction to cause scrolling in each of the respective directions.

6. The keyboard, as set forth in claim 5, wherein the single button of the scroll mechanism is integrated with the track ball mechanism.

7. The keyboard, as set forth in claim 1, wherein the scroll mechanism comprises:
   a left scroll button;
   a right scroll button; and
   a wheel adapted to scroll up and down.

8. The keyboard, as set forth in claim 7, wherein the wheel of the scroll mechanism is integrated with the track ball mechanism.

9. The keyboard, as set forth in claim 1, wherein the scroll mechanism comprises:
   a joystick moveable in a left direction, a right direction, an upward direction, and a downward direction to cause scrolling in each of the respective directions.

10. The keyboard, as set forth in claim 9, wherein scroll mechanism comprises:
    a guide in which the joystick is disposed.

11. The keyboard, as set forth in claim 10, wherein the guide of the scroll mechanism is integrated with the track ball mechanism.

12. The keyboard, as set forth in claim 1, wherein both the track ball mechanism and the scroll mechanism are located less than one inch from the standard keypad.

13. The keyboard, as set forth in claim 1, wherein the track ball mechanism and the scroll mechanism are disposed below the standard keypad.

14. A keyboard, as set forth in claim 13, wherein at least one of the track ball mechanism and the scroll mechanism is located centrally below the standard keypad.

15. The keyboard comprising:
    a standard keypad;
    a track ball mechanism; and
    a scroll mechanism being located less than one inch from the track ball mechanism, at least one of the track ball mechanism and the scroll mechanism being located less than one inch from the standard keypad, wherein the scroll mechanism comprises:
    a left scroll button;
    a right scroll button; and
    an up/down scroll button.

16. The keyboard, as set forth in claim 15, wherein the track ball mechanism is disposed below the scroll mechanism.

17. The keyboard, as set forth in claim 15, wherein the track ball mechanism is disposed to the left of the scroll mechanism.

18. The keyboard, as set forth in claim 15, wherein both the track ball mechanism and the scroll mechanism are located less than one inch from the standard keypad.

19. The keyboard, as set forth in claim 15, wherein the track ball mechanism is disposed to the right of the scroll mechanism.

20. The keyboard, as set forth in claim 15, wherein up/down button of the scroll mechanism is integrated with the track ball mechanism.

21. The keyboard, as set forth in claim 15, wherein the track ball mechanism is disposed above the scroll mechanism.

22. A keyboard comprising:

a standard keypad;

a track ball mechanism located centrally beneath the standard keypad; and a scroll mechanism being located less than one inch from the track ball mechanism, wherein the track ball mechanism is disposed above the scroll mechanism.

23. The keyboard, as set forth in claim 22, wherein both the track ball mechanism and the scroll mechanism are located less than one inch from the standard keypad.

24. The keyboard, as set forth in claim 22, wherein the standard keypad comprises a "QWERTY" keypad.

25. The keyboard, as set forth in claim 22, wherein the track ball mechanism comprises:

a track ball; and two buttons positioned adjacent the track ball.

26. The keyboard, as set forth in claim 22, wherein the scroll mechanism comprises:

a device adapted to scroll up;

a device adapted to scroll down;

a device adapted to scroll left; and a device adapted to scroll right.

27. The keyboard, as set forth in claim 22, wherein the scroll mechanism comprises:

a single button moveable in a left direction, a right direction, an upward direction, and a downward direction to cause scrolling in each of the respective directions.

28. The keyboard, as set forth in claim 27, wherein the single button of the scroll mechanism is integrated with the track ball mechanism.

29. The keyboard, as set forth in claim 22, wherein the track ball mechanism is located less than one inch from the standard keypad.

30. The keyboard, as set forth in claim 22, wherein the scroll mechanism is located less than one inch from the standard keypad.

31. The keyboard, as set forth in claim 22, wherein the scroll mechanism comprises:

a joystick moveable in a left direction, a right direction, an upward direction, and a downward direction to cause scrolling in each of the respective directions.

32. The keyboard, as set forth in claim 31, wherein scroll mechanism comprises:

a guide in which the joystick is disposed.

33. The keyboard, as set forth in claim 32, wherein the guide of the scroll mechanism is integrated with the track ball mechanism.

34. The keyboard, as set forth in claim 22, wherein the scroll mechanism is located centrally below the standard keypad.

35. A keyboard comprising:

a standard keypad;

a track ball mechanism located centrally beneath the standard keypad; and a scroll mechanism being located less than one inch from the track ball mechanism, wherein the scroll mechanism comprises:

a left scroll button;

a right scroll button; and an up/down scroll button.

36. The keyboard, as set forth in claim 35, wherein up/down button of the scroll mechanism is integrated with the track ball mechanism.

37. The keyboard, as set forth in claim 35, wherein the track ball mechanism is disposed above the scroll mechanism.

38. The keyboard, as set forth in claim 35, wherein the track ball mechanism is disposed below the scroll mechanism.

39. The keyboard, as set forth in claim 35, wherein the track ball mechanism is disposed to the left of the scroll mechanism.

40. The keyboard, as set forth in claim 35, wherein both the track ball mechanism and the scroll mechanism are located less than one inch from the standard keypad.

41. The keyboard, as set forth in claim 35, wherein the track ball mechanism is disposed to the right of the scroll mechanism.

42. The keyboard, as set forth in claim 22, wherein the scroll mechanism comprises:

a left scroll button;

a right scroll button; and a wheel adapted to scroll up and down.

43. The keyboard, as set forth in claim 42, wherein the wheel of the scroll mechanism is integrated with the track ball mechanism.

* * * * *